(12) United States Patent
Yang et al.

(10) Patent No.: US 8,508,833 B2
(45) Date of Patent: Aug. 13, 2013

(54) PIXEL UNIT OF ELECTROCHROMIC DISPLAY PANEL AND DRIVING METHOD THEREOF

(75) Inventors: Ming-Huan Yang, Taichung County (TW); Chao-Feng Sung, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 97 days.

(21) Appl. No.: 13/165,751

(22) Filed: Jun. 21, 2011

(65) Prior Publication Data

US 2012/0170100 A1    Jul. 5, 2012

(30) Foreign Application Priority Data

Dec. 29, 2010   (TW) ................................ 99146624 A

(51) Int. Cl.
*G02F 1/153*    (2006.01)

(52) U.S. Cl.
USPC ........................... 359/271; 359/265; 359/273

(58) Field of Classification Search
USPC .................. 359/237–238, 240–259, 265–279
See application file for complete search history.

(56) References Cited

U.S. PATENT DOCUMENTS

| | | | |
|---|---|---|---|
| 4,522,691 A | | 6/1985 | Suginoya et al. |
| 4,983,957 A | * | 1/1991 | Ishikawa et al. ............... 359/265 |
| 7,116,309 B1 | | 10/2006 | Kimura et al. |
| 7,352,500 B2 | | 4/2008 | Jagt et al. |
| 7,450,294 B2 | | 11/2008 | Weidner |
| 7,603,797 B2 | | 10/2009 | Chung |
| 2005/0253800 A1 | * | 11/2005 | Johnson et al. ............... 345/105 |
| 2008/0137168 A1 | | 6/2008 | Abe |
| 2009/0161195 A1 | | 6/2009 | Jang et al. |
| 2009/0168140 A1 | | 7/2009 | Chung et al. |
| 2010/0002175 A1 | | 1/2010 | Kim et al. |

OTHER PUBLICATIONS

Roger J. Mortimer, Electrochromic Materials, Jan. 1, 1997, Chemical Socity Reviews, vol. 26,, 147-156.*

* cited by examiner

*Primary Examiner* — Scott J Sugarman
*Assistant Examiner* — Robert E Tallman
(74) *Attorney, Agent, or Firm* — Jianq Chyun IP Office

(57) ABSTRACT

A pixel unit of an electrochromic display panel and a driving method thereof are described. The pixel unit includes a first substrate; a first electrode and a second electrode, on the first substrate; a first auxiliary counter electrode, on the first substrate and disposed between the first electrode and the second electrode; a first electrochromic material, on the first electrode; a second electrochromic material, on the second electrode; a second substrate, opposite to the first substrate; a third electrode, on the second substrate; a third electrochromic material, on the third electrode; and an electrolyte layer, between the first substrate and the second substrate.

21 Claims, 8 Drawing Sheets

PIXEL UNIT OF ELECTROCHROMIC DISPLAY PANEL AND DRIVING METHOD THEREOF

CROSS-REFERENCE TO RELATED APPLICATION

This application claims the priority benefit of Taiwan application serial no. 99146624, filed Dec. 29, 2010. The entirety of the above-mentioned patent application is hereby incorporated by reference herein and made a part of this specification.

TECHNICAL FIELD

The disclosure relates to a pixel unit of an electrochromic display panel and a driving method thereof.

BACKGROUND

The development of color electronic books has always been the focus of many industries, but existing color electronic books have a common problem of insufficient reflectivity. In a reflective display panel, two noticeable technologies are used: one is an electrochromic display technology, and the other is a cholesteric liquid crystal display technology.

In a cholesteric liquid crystal display panel, since a cholesteric liquid crystal can only reflect light of a single polarization state (for example, left-polarized light or right-polarized light), the reflectivity of the cholesteric liquid crystal display panel is physically limited. In addition, in order to achieve a color cholesteric liquid crystal display panel, a plurality of red, green, and blue sub-pixel areas is used for presentation. However, the reflectivity of the cholesteric liquid crystal display panel is further decreased accordingly, thus resulting in poor color display and low contrast.

In an electrochromic display panel, diverse colors may be displayed, and the reflectivity may approach that of paper, so that the electrochromic display technology is a promising display technology. Currently, many material suppliers and academic research institutes have invested in the development, and it is believed that in the future, the switching rate and service life of the electrochromic display panel will be improved substantially.

SUMMARY

An embodiment of the disclosure provides a pixel unit of an electrochromic display panel, which includes a first substrate; a first electrode and a second electrode, on the first substrate; a first auxiliary counter electrode, on the first substrate and disposed between the first electrode and the second electrode; a first electrochromic material, on the first electrode; a second electrochromic material, on the second electrode; a second substrate, opposite to the first substrate; a third electrode, on the second substrate; a third electrochromic material, on the third electrode; and an electrolyte layer, between the first substrate and the second substrate.

An embodiment of the disclosure provides a method for driving the above pixel unit of an electrochromic display panel, including the following steps. When a first voltage is applied to the first electrode and the second electrode, a second voltage is applied to the third electrode, and a third voltage is applied to the first auxiliary counter electrode, the pixel unit displays black as viewed from the top or the bottom of the pixel unit. When the first voltage is applied to the third electrode, the second voltage is applied to the first auxiliary counter electrode, and the third voltage is applied to the first electrode and the second electrode, the pixel unit displays white as viewed from the top or the bottom of the pixel unit. When the first voltage is applied to the third electrode, the second voltage is applied to the first electrode and the second electrode, and the third voltage is applied to the first auxiliary counter electrode, the pixel unit displays a first color as viewed from the top or the bottom of the pixel unit. When the first voltage is applied to the first electrode and the second electrode, the second voltage is applied to the first auxiliary counter electrode, and the third voltage is applied to the third electrode, the pixel unit displays a second color as viewed from the top or the bottom of the pixel unit. When the first voltage is applied to the first auxiliary counter electrode, the second voltage is applied to the third electrode, and the third voltage is applied to the first electrode and the second electrode, the pixel unit displays a third color as viewed from the top or the bottom of the pixel unit.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Pixel Unit

Figure 1:
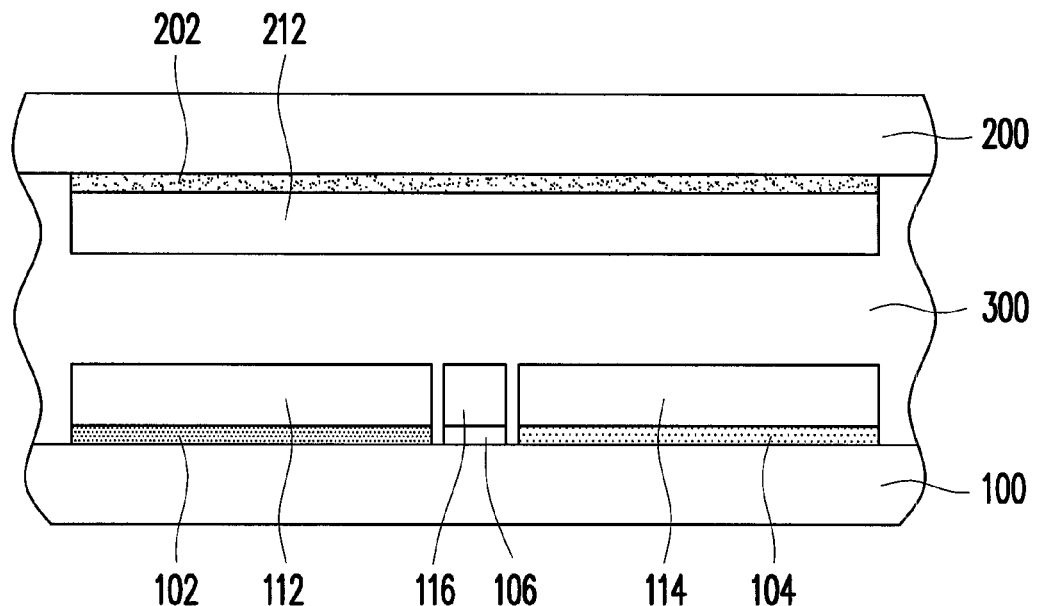
FIG. 1 is a schematic sectional view of a pixel unit of an electrochromic display panel according to an embodiment of the disclosure.

FIG. 1 is a schematic sectional view of a pixel unit of an electrochromic display panel according to an embodiment of the disclosure. Referring to FIG. 1, a pixel unit of an electrochromic display panel of this embodiment includes a first substrate 100, a first electrode 102, a second electrode 104, a first auxiliary counter electrode 106, a first electrochromic material 112, a second electrochromic material 114, a second substrate 200, a third electrode 202, and a third electrochromic material 212.

The first substrate 100 is mainly used for supporting devices and film layers. The second substrate 200 is opposite to the first substrate 100, and is also used for supporting devices and film layers. The first substrate 100 and the second substrate 200 may be rigid substrates or flexible substrates. In addition, the first substrate 100 and the second substrate 200 may be transparent substrates or reflective substrates (when reflective substrates are used, no reflective layer may be needed), which are made of glass, silicon, metal, high polymer, or other suitable materials. It should be noted that, both the first substrate 100 and the second substrate 200 may be transparent substrates, or one of the first substrate 100 and the second substrate 200 is a reflective substrate. In addition, an electrolyte layer 300 is between the first substrate 100 and the second substrate 200, and may be a polar liquid including water and metal salts dissolved in water, or including a polar solvent and metal salts dissolved in the polar solvent.

The first electrode 102 and the second electrode 104 are on the first substrate 100, and the first electrode 102 and the second electrode 104 are electrically insulated from each other. In addition, the third electrode 202 is on the second substrate 200. According to this embodiment, the third electrode 202 is disposed above the first electrode 102 and the second electrode 104. In other words, an area of the third electrode 202 covers an area of the first electrode 102 and the second electrode 104. Here, the first electrode 102, the second electrode 104, and the third electrode 202 may independently be a transparent electrode or a reflective electrode. The transparent electrode may be made of a metal oxide, for example, indium tin oxide, indium zinc oxide, aluminum tin oxide, aluminum zinc oxide, indium gallium zinc oxide, or other suitable materials. The reflective electrode is made of, for example, metal. According an embodiment, if the first electrode 102, the second electrode 104, and the third electrode 202 are all transparent electrodes, one of the first substrate 100 and the second substrate 200 is a reflective substrate. When the first substrate 100 is a reflective substrate, a viewer has to view a screen from the second substrate 200, that is, look down from the top of FIG. 1. When the second substrate 200 is a reflective substrate, the viewer has to view the screen from the first substrate 100, that is, look up from the bottom of FIG. 1. According to another embodiment, the first electrode 102 and the second electrode 104 are reflective electrodes, and the third electrode 202 is a transparent electrode, and in this case, the viewing direction of the viewer is from top to bottom. According to still another embodiment, the first electrode 102 and the second electrode 104 are transparent electrodes, and the third electrode 202 is a reflective electrode, and in this case, the viewing direction of the viewer is from bottom to top.

In addition, the first auxiliary counter electrode 106 is on the first substrate 100, and is disposed between the first electrode 102 and the second electrode 104. The first auxiliary counter electrode 106 is electrically insulated from the first electrode 102, and the first auxiliary counter electrode 106 is also electrically insulated from the second electrode 104. According to this embodiment, a shading pattern 116 may be further disposed on the first auxiliary counter electrode 106. However, in another embodiment, the shading pattern 116 may not be included.

In addition, the first electrochromic material 112 is on the first electrode 102. The second electrochromic material 114 is on the second electrode 104. The third electrochromic material 212 is on the third electrode 202. According to this embodiment, the third electrochromic material 212 is above the first electrochromic material 112 and the second electrochromic material 114. In other words, an area of the third electrochromic material 212 covers an area of the first electrochromic material 112 and the second electrochromic material 114.

Here, one of the first electrochromic material 112, the second electrochromic material 114, and the third electrochromic material 212 is a monochromatic-transparent electrochromic material, and the other two are a dichromatic-transparent electrochromic material. Preferably, the first electrochromic material 112 and the second electrochromic material 114 are a dichromatic-transparent electrochromic material, and the third electrochromic material 212 is a monochromatic-transparent electrochromic material. Generally, the monochromatic-transparent electrochromic material refers to a material which can switch between a single color and transparent according to a driving voltage. For example, when a reduction voltage is applied to an electrode of the monochromatic-transparent electrochromic material, the monochromatic-transparent electrochromic material may be colored to be red (R); and when no voltage is applied to the electrode of the monochromatic-transparent electrochromic material, the monochromatic-transparent electrochromic material may be decolored to be transparent (T). In addition, the dichromatic-transparent electrochromic material refers to a material which can switch between two colors and transparent according to a driving voltage. For example, when a reduction voltage is applied to an electrode of the dichromatic-transparent electrochromic material, the dichromatic-transparent electrochromic material may be colored to be green (G); when an oxidation voltage is applied to the electrode of the dichromatic-transparent electrochromic material, the dichromatic-transparent electrochromic material may be colored to be blue (B); and when no voltage is applied to the dichromatic-transparent electrochromic material, the dichromatic-transparent electrochromic material may be decolored to be transparent (T).

The monochromatic-transparent electrochromic material may be selected from a blue-transparent (B-T) electrochromic material, a green-transparent (G-T) electrochromic material, or a red-transparent (R-T) electrochromic material. The dichromatic-transparent electrochromic material may be selected from a blue-green-transparent (B-G-T) electrochromic material, a green-red-transparent (G-R-T) electrochromic material, or a red-blue-transparent (R-B-T) electrochromic material. In order to enable the pixel unit to present red, green, and blue, the first electrochromic material 112, the second electrochromic material 114, and the third electrochromic material 212 are preferably selected from electrochromic materials covering red, green, and blue. For example, the first electrochromic material 112 and the second electrochromic material 114 are the B-G-T electrochromic material, and the third electrochromic material 212 is the R-T electrochromic material.

Figure 2:
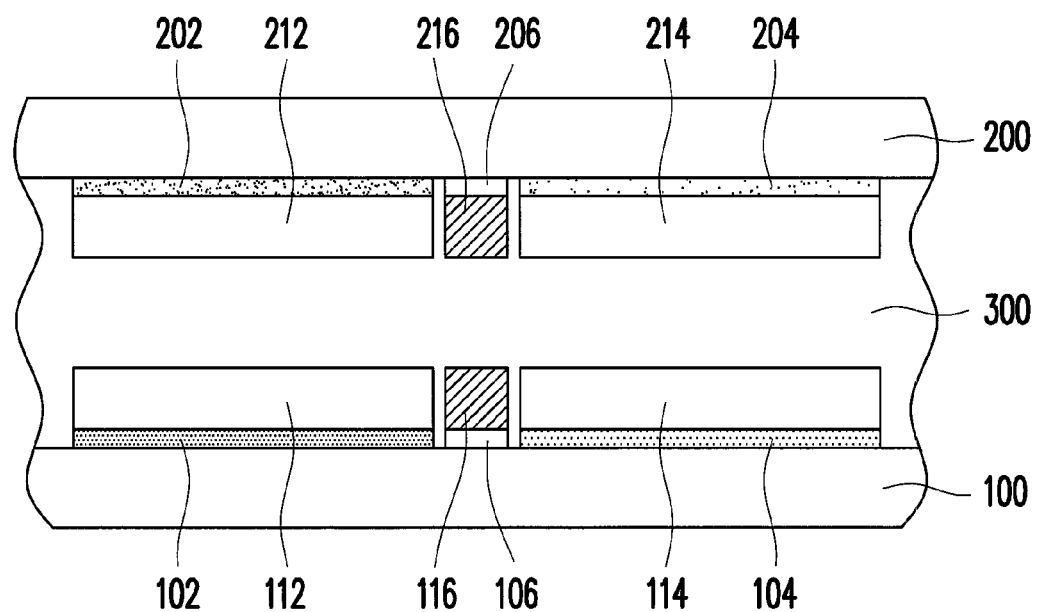
FIG. 2 is a schematic sectional view of a pixel unit of an electrochromic display panel according to another embodiment of the disclosure.

FIG. 2 is a schematic sectional view of a pixel unit of an electrochromic display panel according to another embodiment of the disclosure. Since the embodiment of FIG. 2 is similar to that of FIG. 1, elements in FIG. 2 that are the same as those in FIG. 1 are represented by the same symbols, and are not repeated again. The difference between the embodiment of FIG. 2 and that of FIG. 1 lies in that, the embodiment of FIG. 2 further includes a fourth electrode 204, a fourth electrochromic material 214, and a second auxiliary counter electrode 206.

The fourth electrode 204 is on the second substrate 200, and is electrically insulated from the third electrode 202. Here, the third electrode 202 is correspondingly disposed above the first electrode 102, and the fourth electrode 204 is correspondingly disposed above the second electrode 104. The fourth electrode 204 may be a transparent electrode or a reflective electrode, and may be made of a material as that of the first, second, and third electrodes. If the third electrode 202 is a transparent electrode, the fourth electrode 204 is also a transparent electrode, and in this case the viewing direction of the viewer is from top to bottom. If the third electrode 202 is a reflective electrode, the fourth electrode 204 is also a reflective electrode, and in this case the viewing direction of the viewer is from bottom to top.

The second auxiliary counter electrode 206 is on the second substrate 200, and is disposed between the third electrode 202 and the fourth electrode 204. The second auxiliary counter electrode 206 is electrically insulated from the third electrode 202, and the second auxiliary counter electrode 206 is also electrically insulated from the fourth electrode 204. According to this embodiment, a shading pattern 216 may be further disposed on the second auxiliary counter electrode 206. However, in another embodiment, the shading pattern 216 may not be included.

The fourth electrochromic material 214 is on the fourth electrode 204. Here, two of the first electrochromic material 112, the second electrochromic material 114, the third electrochromic material 212, and the fourth electrochromic material 214 are a monochromatic-transparent electrochromic material, and the other two are a dichromatic-transparent electro chromic material. Similarly, the monochromatic-transparent electrochromic material may be selected from a B-T electrochromic material, a G-T electrochromic material, or an R-T electrochromic material. The dichromatic-transparent electrochromic material may be selected from a B-G-T electrochromic material, a G-R-T electrochromic material, or an R-B-T electrochromic material. In order to enable the pixel unit to present red, green, blue, and other colors, the first electrochromic material 112, the second electrochromic material 114, the third electrochromic material 212, and the fourth electrochromic material 214 are preferably selected from electrochromic materials covering red, green, and blue. For example, the first electrochromic material 112 and the second electrochromic material 114 are the B-G-T electrochromic material, and the third electrochromic material 212 and the fourth electrochromic material 214 are the R-T electrochromic material.

Driving Method

FIGS. 3 to 7 are schematic views of a driving method of a pixel unit of an electrochromic display panel according to an embodiment of the disclosure. Specifically, FIGS. 3 to 7 show a driving method corresponding to the pixel unit of an electrochromic display panel of FIG. 1. In order to illustrate in detail color display of the pixel unit of this embodiment, an example is taken, in which the first electrochromic material 112 and the second electrochromic material 114 of this embodiment are the B-G-T dichromatic electrochromic material, and the third electrochromic material 212 of this embodiment is the R-T monochromatic electrochromic material. However, the disclosure is not limited thereto. In other words, in other embodiments, the first electrochromic material 112, the second electrochromic material 114, and the third electrochromic material 212 may be combinations of other electrochromic materials.

Figure 3:
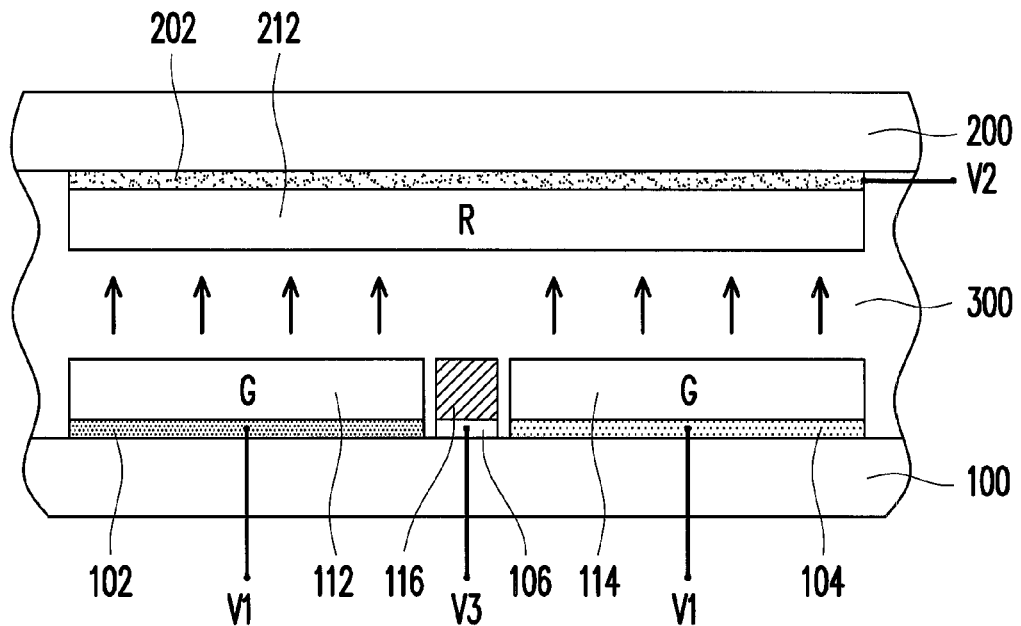
FIGS. 3 to 7 are schematic views of a driving method of a pixel unit of an electrochromic display panel according to an embodiment of the disclosure.

Referring to FIG. 3, if the pixel unit is to display black, a first voltage V1 (for example, a reduction voltage) is applied to the first electrode 102 and the second electrode 104, a second voltage V2 (for example, an oxidation voltage) is applied to the third electrode 202, and a third voltage V3 (for example, a zero voltage) is applied to the first auxiliary counter electrode 106. In this case, since the first electrode 102 and the second electrode 104 are at a reduction potential, the third electrode 202 is at an oxidation potential, and the first auxiliary counter electrode 106 is in an open circuit state, electric currents (as indicated by arrows) flow from the first electrode 102 and the second electrode 104 to the third electrode 202. As such, the first electrochromic material 112 and the second electrochromic material 114 are colored to be green (G), and the third electrochromic material 212 is colored to be red (R). Therefore, in this case the pixel unit presents black when viewed from the top or the bottom of the pixel unit.

Figure 4:
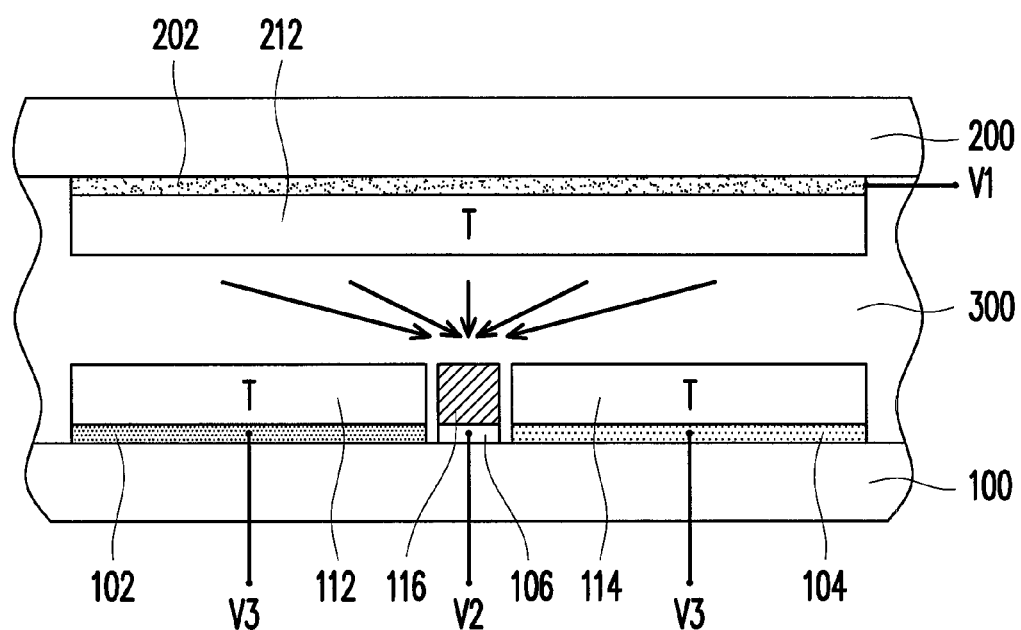

Referring to FIG. 4, if the pixel unit is to display white, the first voltage V1 (for example, the reduction voltage) is applied to the third electrode 202, the second voltage V2 (for example, the oxidation voltage) is applied to the first auxiliary counter electrode 106, and the third voltage V3 (for example, the zero voltage) is applied to the first electrode 102 and the second electrode 104. In this case, since the third electrode 202 is at the reduction potential, the first auxiliary counter electrode 106 is at the oxidation potential, and the first electrode 102 and the second electrode 104 are in an open circuit state, electric currents (as indicated by arrows) flow from the third electrode 202 to the first auxiliary counter electrode 106. As such, the first electrochromic material 112, the second electrochromic material 114, and the third electrochromic material 212 are all decolored to be transparent (T). Therefore, in this case the pixel unit presents white when viewed from the top or the bottom of the pixel unit.

Figure 5:
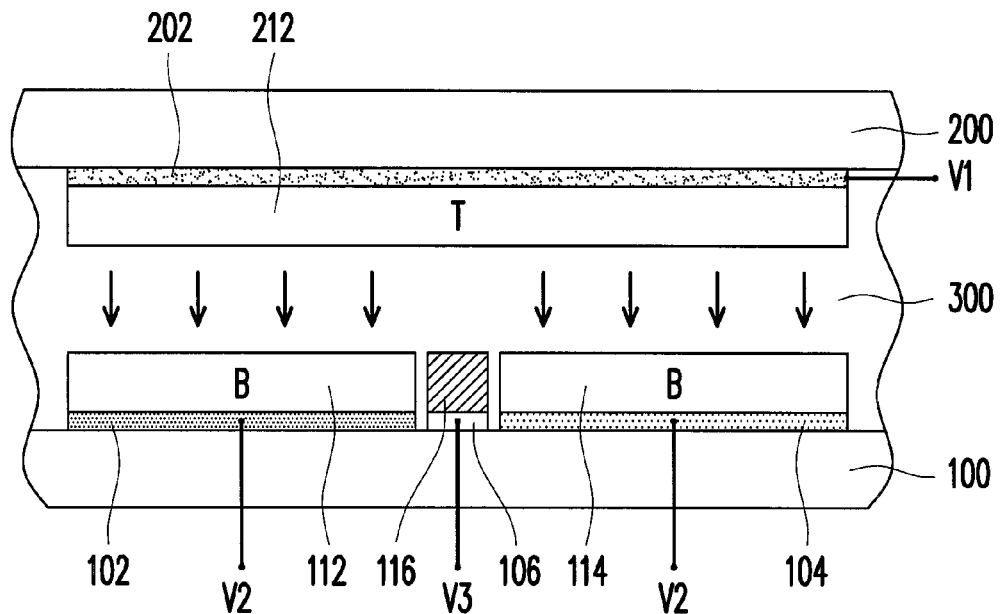

Referring to FIG. 5, if the pixel unit is to display blue, the first voltage V1 (for example, the reduction voltage) is applied to the third electrode 202, the second voltage V2 (for example, the oxidation voltage) is applied to the first electrode 102 and the second electrode 104, and the third voltage V3 (for example, the zero voltage) is applied to the first auxiliary counter electrode 106. In this case, since the third electrode 202 is at the reduction potential, the first electrode 102 and the second electrode 104 are at the oxidation potential, and the first auxiliary counter electrode 106 is in an open circuit state, electric currents (as indicated by arrows) flow from the third electrode 202 to the first electrode 102 and the second electrode 104. As such, the first electrochromic material 112 and the second electrochromic material 114 are colored to be blue (B), and the third electrochromic material 212 is decolored to be transparent (T). Therefore, in this case the pixel unit presents blue when viewed from the top or bottom of the pixel unit.

Figure 6:
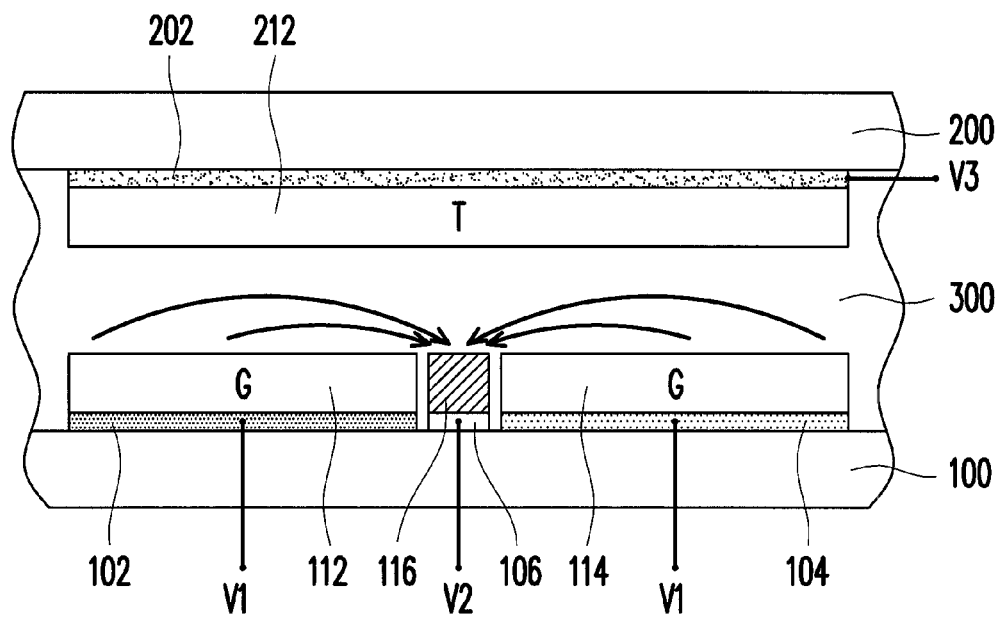

Referring to FIG. 6, if the pixel unit is to display green, the first voltage V1 (for example, the reduction voltage) is applied to the first electrode 102 and the second electrode 104, the second voltage V2 (for example, the oxidation voltage) is applied to the first auxiliary counter electrode 106, and the third voltage V3 (for example, the zero voltage) is applied to the third electrode 202. In this case, since the first electrode 102 and the second electrode 104 are at the reduction potential, the first auxiliary counter electrode 106 is at the oxidation potential, and the third electrode 202 is in an open circuit state, electric currents (as indicated by arrows) flow from the first electrode 102 and the second electrode 104 to the first auxiliary counter electrode 106. As such, the first electrochromic material 112 and the second electrochromic material 114 are colored to be green (G), and the third electrochromic material 212 is decolored to be transparent (T). Therefore, in this case the pixel unit presents green when viewed from the top or the bottom of the pixel unit.

Figure 7:
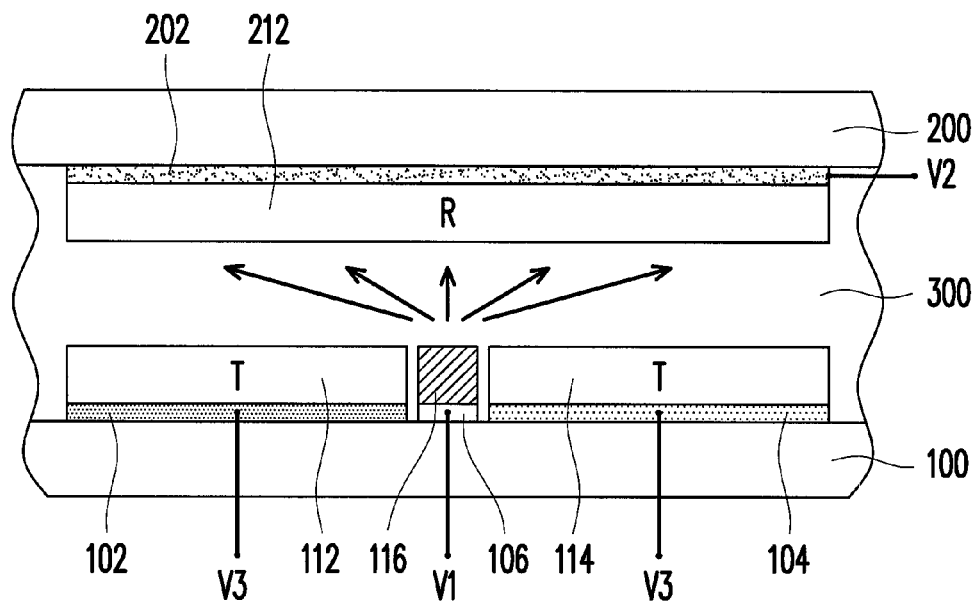

Referring to FIG. 7, if the pixel unit is to display red, the first voltage V1 (for example, the reduction voltage) is applied to the first auxiliary counter electrode 106, the second voltage V2 (for example, the oxidation voltage) is applied to the third electrode 202, and the third voltage V3 (for example, the zero voltage) is applied to the first electrode 102 and the second electrode 104. In this case, since the first auxiliary counter electrode 106 is at the reduction potential, the third electrode 202 is at the oxidation potential, and the first electrode 102 and the second electrode 104 are in an open circuit state, electric currents (as indicated by arrows) flow from the first auxiliary counter electrode 106 to the third electrode 202. As such, the first electrochromic material 112 and the second electrochromic material 114 are decolored to be transparent (T), and the third electrochromic material 212 is colored to be red (R). Therefore, in this case the pixel unit presents red when viewed from the top or the bottom of the pixel unit.

FIGS. 8 to 15 are schematic views of a driving method of a pixel unit of an electrochromic display panel according to another embodiment of the disclosure. Specifically, FIGS. 8 to 15 show a driving method corresponding to the pixel unit of an electrochromic display panel of FIG. 2. In order to illustrate in detail color display of the pixel unit of this embodiment, an example is taken, in which the first electrochromic material 112 and the second electrochromic material 114 of this embodiment are the B-G-T dichromatic electrochromic material, and the third electrochromic material 212 and the fourth electrochromic material 214 of this embodiment are the R-T monochromatic electrochromic material. However, the disclosure is not limited thereto. In other words, in other embodiments, the first electrochromic material 112, the second electrochromic material 114, the third electrochromic material 212, and the fourth electrochromic material 214 may be combinations of other electrochromic materials.

Figure 8:
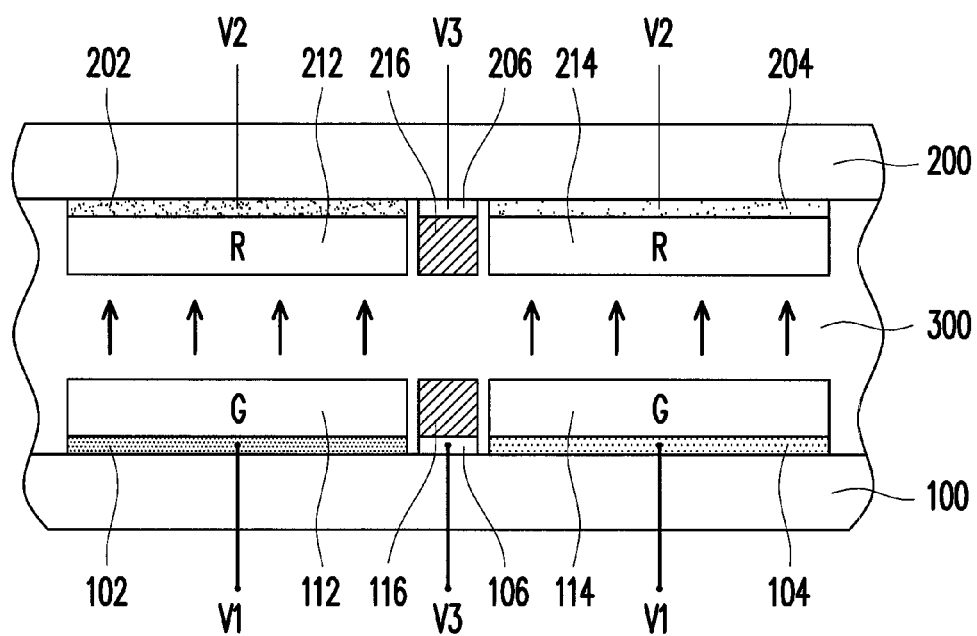
FIGS. 8 to 15 are schematic views of a driving method of a pixel unit of an electrochromic display panel according to another embodiment of the disclosure.

Referring to FIG. 8, if the pixel unit is to display black, the first voltage V1 (for example, the reduction voltage) is applied to the first electrode 102 and the second electrode 104, the second voltage V2 (for example, the oxidation voltage) is applied to the third electrode 202 and the fourth electrode 204, and the third voltage V3 (for example, the zero voltage) is applied to the first auxiliary counter electrode 106 and the second auxiliary counter electrode 206. In this case, since the first electrode 102 and the second electrode 104 are at the reduction potential, the third electrode 202 and the fourth electrode 204 are at the oxidation potential, and the first auxiliary counter electrode 106 and the second auxiliary counter electrode 206 are in an open circuit state, electric currents (as indicated by arrows) flow from the first electrode 102 and the second electrode 104 to the third electrode 202 and the fourth electrode 204. As such, the first electrochromic material 112 and the second electrochromic material 114 are colored to be green (G), and the third electrochromic material 212 and the fourth electrochromic material 214 are colored to be red (R). Therefore, in this case the pixel unit presents black when viewed from the top or the bottom of the pixel unit.

Figure 9:
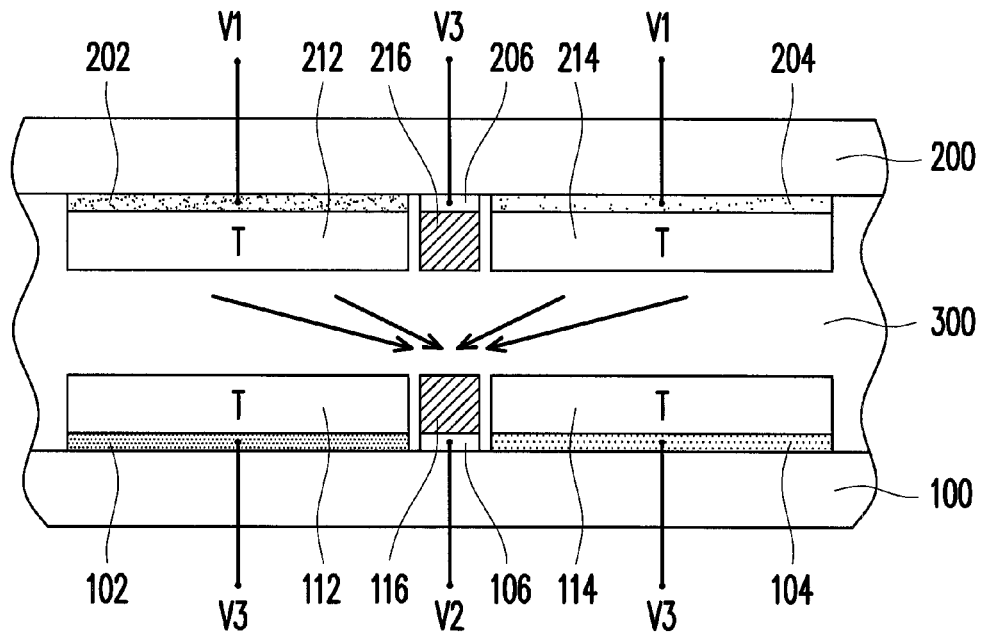

Referring to FIG. 9, if the pixel unit is to display white, the first voltage V1 (for example, the reduction voltage) is applied to the third electrode 202 and the fourth electrode 204, the second voltage V2 (for example, the oxidation voltage) is applied to the first auxiliary counter electrode 106, and the third voltage V3 (for example, the zero voltage) is applied to the first electrode 102, the second electrode 104, and the second auxiliary counter electrode 206. In this case, since the third electrode 202 and the fourth electrode 204 are at the reduction potential, the first auxiliary counter electrode 106 is at the oxidation potential, and the first electrode 102, the second electrode 104, and the second auxiliary counter electrode 206 are in an open circuit state, electric currents (as indicated by arrows) flow from the third electrode 202 and the fourth electrode 204 to the first auxiliary counter electrode 106. As such, the first electrochromic material 112, the second electrochromic material 114, the third electrochromic material 212, and the fourth electrochromic material 214 are all decolored to be transparent (T). Therefore, in this case the pixel unit presents white when viewed from the top or the bottom of the pixel unit.

Figure 10:
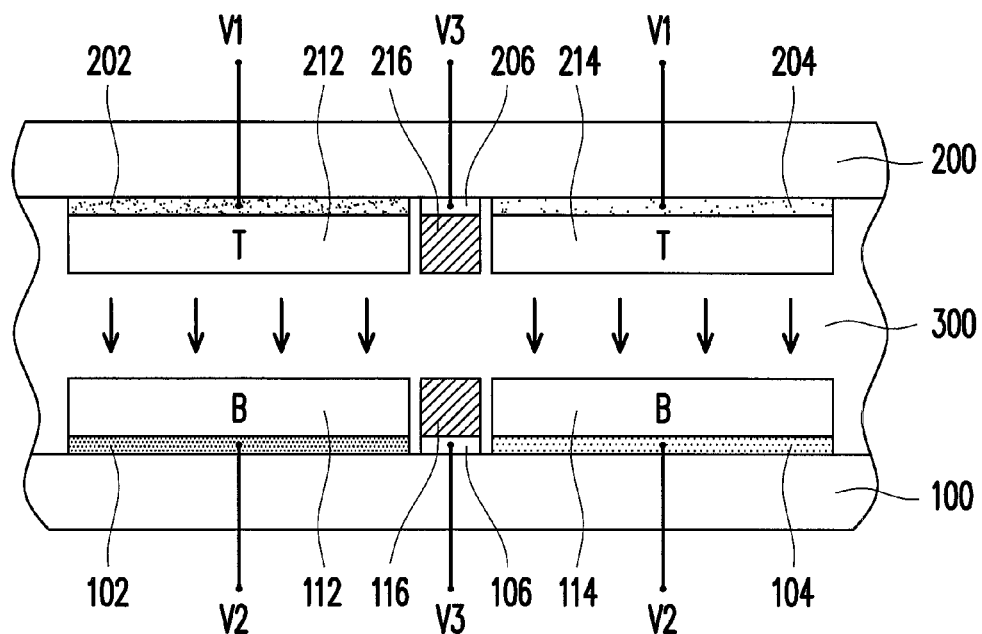

Referring to FIG. 10, if the pixel unit is to display blue, the first voltage V1 (for example, the reduction voltage) is applied to the third electrode 202 and the fourth electrode 204, the second voltage V2 (for example, the oxidation voltage) is applied to the first electrode 102 and the second electrode 104, and the third voltage V3 (for example, the zero voltage) is applied to the first auxiliary counter electrode 106 and the second auxiliary counter electrode 206. In this case, since the third electrode 202 and the fourth electrode 204 are at the reduction potential, the first electrode 102 and the second electrode 104 are at the oxidation potential, and the first auxiliary counter electrode 106 and the second auxiliary counter electrode 206 are in an open circuit state, electric currents (as indicated by arrows) flow from the third electrode 202 and the fourth electrode 204 to the first electrode 102 and the second electrode 104. As such, the first electrochromic material 112 and the second electrochromic material 114 are colored to be blue (B), and the third electrochromic material 212 and the fourth electrochromic material 214 are decolored to be transparent (T). Therefore, in this case the pixel unit presents blue when viewed from the top or the bottom of the pixel unit.

Figure 11:
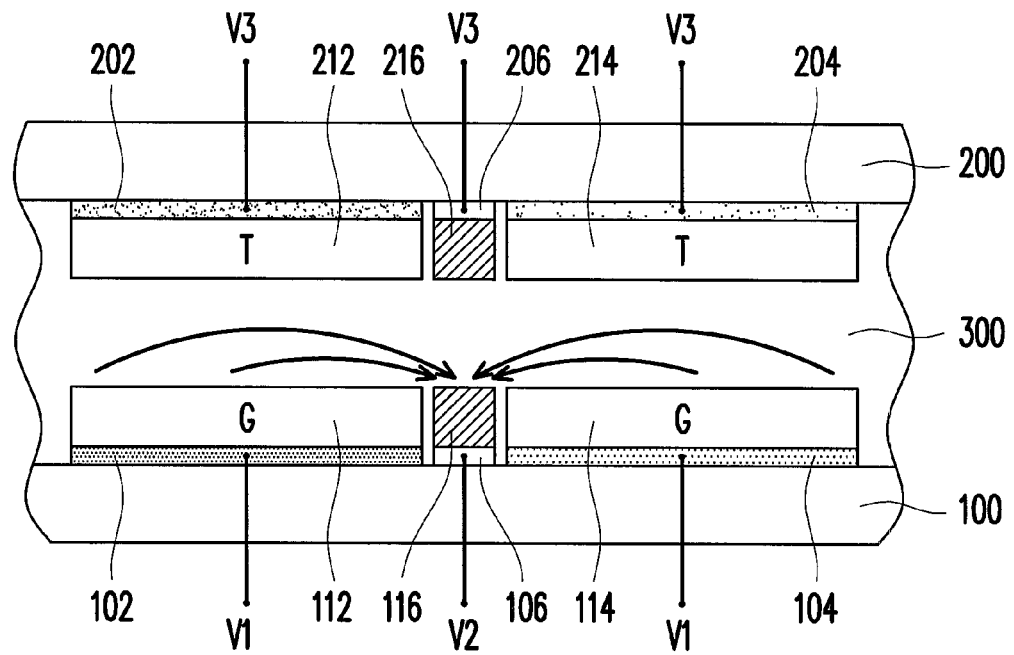

Referring to FIG. 11, if the pixel unit is to display green, the first voltage V1 (for example, the reduction voltage) is applied to the first electrode 102 and the second electrode 104, the second voltage V2 (for example, the oxidation voltage) is applied to the first auxiliary counter electrode 106, and the third voltage V3 (for example, the zero voltage) is applied to the third electrode 202, the fourth electrode 204, and the second auxiliary counter electrode 206. In this case, since the first electrode 102 and the second electrode 104 are at the reduction potential, the first auxiliary counter electrode 106 is at the oxidation potential, and the third electrode 202, the fourth electrode 204, and the second auxiliary counter electrode 206 are in an open circuit state, electric currents (as indicated by arrows) flow from the first electrode 102 and the second electrode 104 to the first auxiliary counter electrode 106. As such, the first electrochromic material 112 and the second electrochromic material 114 are colored to be green (G), and the third electrochromic material 212 and the fourth electrochromic material 214 are decolored to be transparent (T). Therefore, in this case the pixel unit presents green when viewed from the top or the bottom of the pixel unit.

Figure 12:
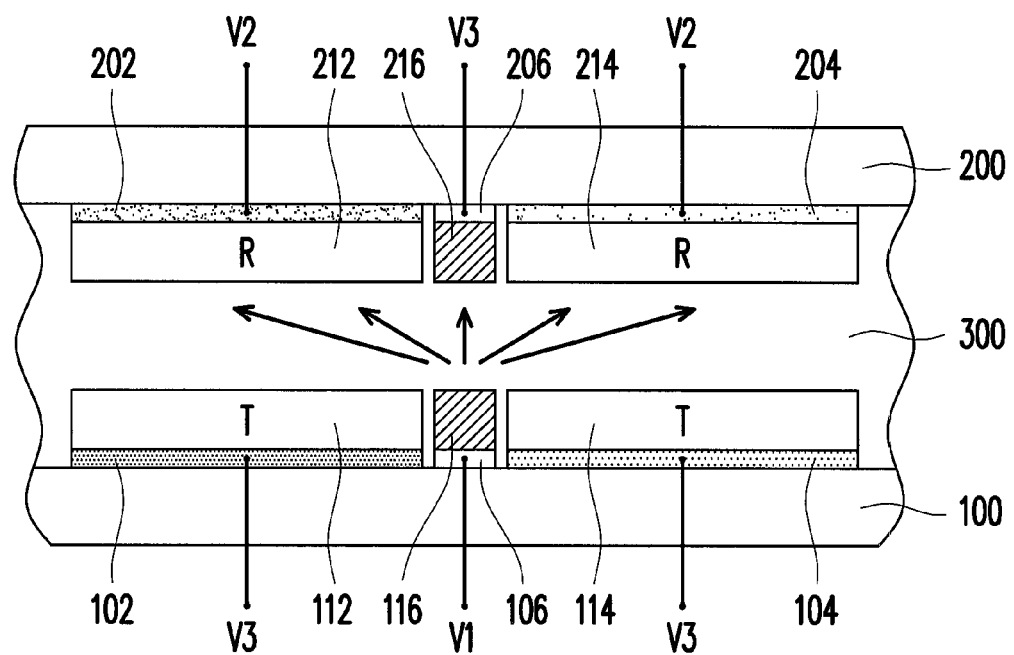

Referring to FIG. 12, if the pixel unit is to display red, the first voltage V1 (for example, the reduction voltage) is applied to the first auxiliary counter electrode 106, the second voltage V2 (for example, the oxidation voltage) is applied to the third electrode 202 and the fourth electrode 204, and the third voltage V3 (for example, the zero voltage) is applied to the first electrode 102, the second electrode 104, and the second auxiliary counter electrode 206. In this case, since the first auxiliary counter electrode 106 is at the reduction potential, the third electrode 202 and the fourth electrode 204 are at the oxidation potential, and the first electrode 102, the second electrode 104, and the second auxiliary counter electrode 206 are in an open circuit state, electric currents (as indicated by arrows) flow from the first auxiliary counter electrode 106 to the third electrode 202 and the fourth electrode 204. As such, the first electrochromic material 112 and the second electrochromic material 114 are decolored to be transparent (T), and the third electrochromic material 212 and the fourth electrochromic material 214 are colored to be red (R). Therefore, in this case the pixel unit presents red when viewed from the top or the bottom of the pixel unit.

Figure 13:
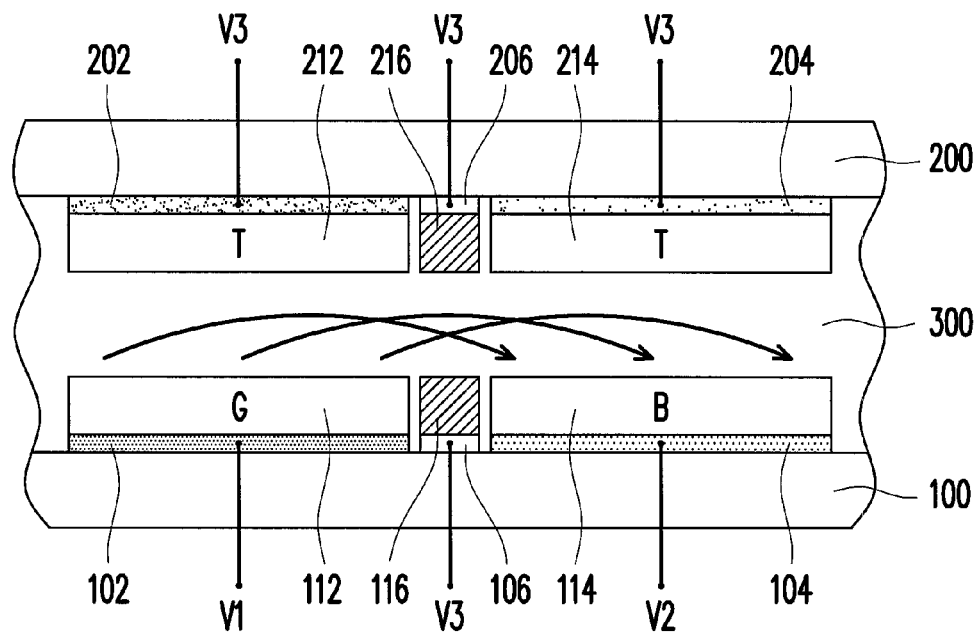

Referring to FIG. 13, if the pixel unit is to display cyan, the first voltage V1 (for example, the reduction voltage) is applied to the first electrode 102, the second voltage V2 (for example, the oxidation voltage) is applied to the second electrode 104, and the third voltage V3 (for example, the zero voltage) is applied to the third electrode 202, the fourth electrode 204, the first auxiliary counter electrode 106, and the second auxiliary counter electrode 206. In this case, since the first electrode 102 is at the reduction potential, the second electrode 104 is at the oxidation potential, and the third electrode 202, the fourth electrode 204, the first auxiliary counter electrode 106, and the second auxiliary counter electrode 206 are in an open circuit state, electric currents (as indicated by arrows) flow from the first electrode 102 to the second electrode 104. As such, the first electrochromic material 112 is colored to be green (G), the second electrochromic material 114 is colored to be blue (B), and the third electrochromic material 212 and the fourth electrochromic material 214 are decolored to be transparent (T). Therefore, in this case the pixel unit presents cyan when viewed from the top or the bottom of the pixel unit.

Figure 14:
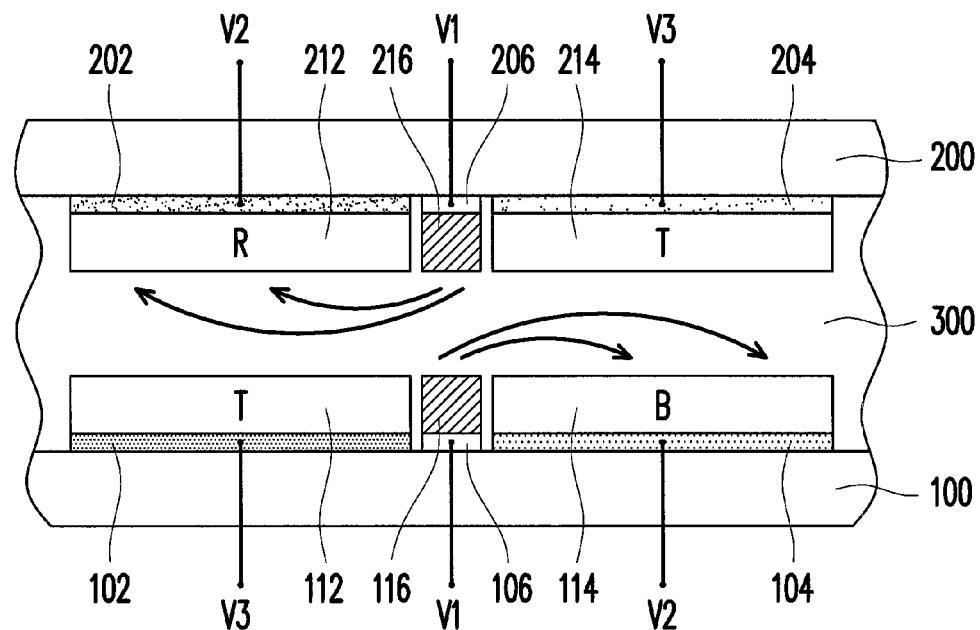

Referring to FIG. 14, if the pixel unit is to display magenta, the first voltage V1 (for example, the reduction voltage) is applied to the first auxiliary counter electrode 106 and the second auxiliary counter electrode 206, the second voltage V2 (for example, the oxidation voltage) is applied to the second electrode 104 and the third electrode 202, and the third voltage V3 (for example, the zero voltage) is applied to the first electrode 102 and the fourth electrode 204. In this case, since the first auxiliary counter electrode 106 and the second auxiliary counter electrode 206 are at the reduction potential, the second electrode 104 and the third electrode 202 are at the oxidation potential, and the first electrode 102 and the fourth electrode 204 are in an open circuit state, electric currents (as indicated by arrows) flow from the first auxiliary counter electrode 106 to the second electrode 104, and flow from the second auxiliary counter electrode 206 to the third electrode 202. As such, the second electrochromic material 114 is colored to be blue (B), the third electrochromic material 212 is colored to be red (R), and the first electrochromic material 112 and the fourth electrochromic material 214 are decolored to be transparent (T). Therefore, in this case the pixel unit presents magenta when viewed from the top or the bottom of the pixel unit.

Figure 15:
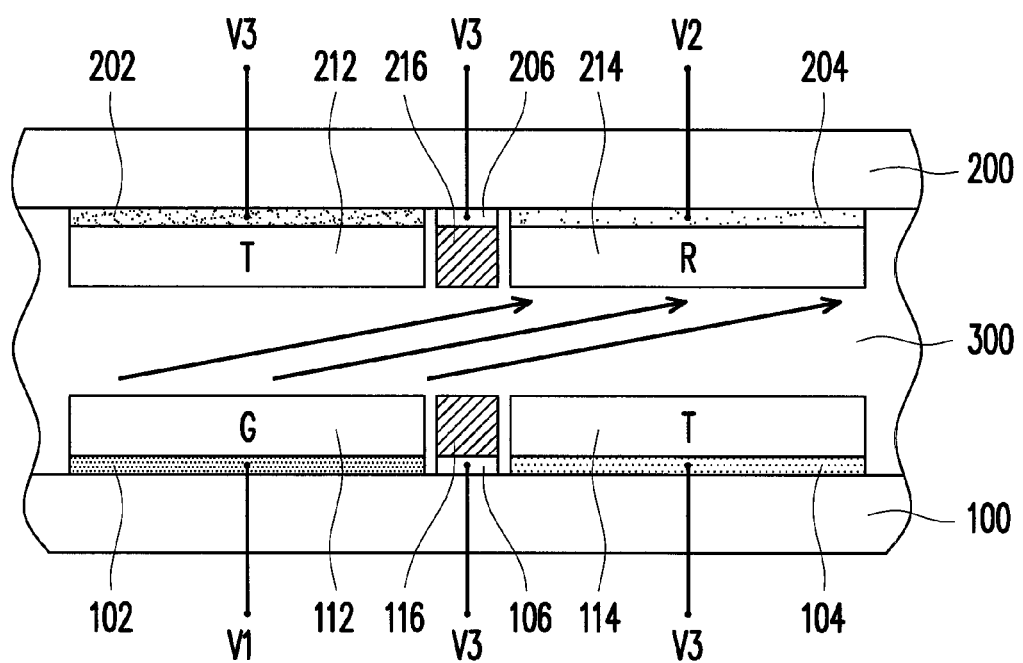

Referring to FIG. 15, if the pixel unit is to display yellow, the first voltage V1 (for example, the reduction voltage) is applied to the first electrode 102, the second voltage V2 (for example, the oxidation voltage) is applied to the fourth electrode 204, and the third voltage V3 (for example, the zero voltage) is applied to the second electrode 104, the third electrode 202, the first auxiliary counter electrode 106, and the second auxiliary counter electrode 206. In this case, since the first electrode 102 is at the reduction potential, the fourth electrode 204 is at the oxidation potential, and the second electrode 104, the third electrode 202, the first auxiliary counter electrode 106, and the second auxiliary counter electrode 206 are in an open circuit state, an electric current (as indicated by arrows) flows from the first electrode 102 to the fourth electrode 204. As such, the first electrochromic material 112 is colored to be green (G), the fourth electrochromic material 214 is colored to be red (R), and the second electrochromic material 114 and the third electrochromic material 212 are decolored to be transparent (T). Therefore, in this case the pixel unit presents yellow when viewed from the top or the bottom of the pixel unit.

Based on the above, according to this disclosure, the plurality of electrochromic materials are disposed in the single pixel unit, and thus the pixel unit may present black, white, or other colors by switching the voltages of the above electrodes. Compared with the conventional reflective display, the design of the pixel unit eliminates the problem of decreased reflectivity, and the driving method of the pixel unit is simple.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pixel unit of an electrochromic display panel, comprising:
   a first substrate;
   a first electrode, on the first substrate;
   a second electrode, on the first substrate and electrically insulated from the first electrode;
   a first auxiliary counter electrode, on the first substrate and disposed between the first electrode and the second electrode;
   a first electrochromic material, on the first electrode;
   a second electrochromic material, on the second electrode;
   a second substrate, opposite to the first substrate;
   a third electrode, on the second substrate;
   a third electrochromic material, on the third electrode; and
   an electrolyte layer, between the first substrate and the second substrate,
   wherein the first electrode, the second electrode, the third electrode, and the first auxiliary counter electrode are driven by different voltages, and the first auxiliary counter electrode controls current directions between the first electrode, the second electrode, the third electrode, and the first auxiliary counter electrode, such that the pixel unit displays a plurality of colors.

2. The pixel unit of an electrochromic display panel according to claim 1, wherein one of the first electrochromic material, the second electrochromic material, and the third electrochromic material is a monochromatic-transparent electrochromic material, and the other two are a dichromatic-transparent electrochromic material.

3. The pixel unit of an electrochromic display panel according to claim 2, wherein the monochromatic-transparent electrochromic material is selected from a blue-transparent (B-T) electrochromic material, a green-transparent (G-T) electrochromic material, or a red-transparent (R-T) electrochromic material.

4. The pixel unit of an electrochromic display panel according to claim 2, wherein the dichromatic-transparent electrochromic material is selected from a blue-green-transparent (B-G-T) electrochromic material, a green-red-transparent (G-R-T) electrochromic material, or a red-blue-transparent (R-B-T) electrochromic material.

5. The pixel unit of an electrochromic display panel according to claim 1, wherein the third electrochromic material is above the first electrochromic material and the second electrochromic material.

6. The pixel unit of an electrochromic display panel according to claim 1, wherein the first electrode and the second electrode are respectively a reflective electrode, and the third electrode is a transparent electrode.

7. The pixel unit of an electrochromic display panel according to claim 1, wherein the first electrode and the second electrode are respectively a transparent electrode, and the third electrode is a reflective electrode.

8. The pixel unit of an electrochromic display panel according to claim 1, further comprising:
   a fourth electrode, on the second substrate;
   a fourth electrochromic material, on the fourth electrode; and
   a second auxiliary counter electrode, on the second substrate and disposed between the third electrode and the fourth electrode.

9. The pixel unit of an electrochromic display panel according to claim 8, wherein two of the first electrochromic material, the second electrochromic material, the third electrochromic material, and the fourth electrochromic material are a monochromatic-transparent electrochromic material, and the other two are a dichromatic-transparent electrochromic material.

10. The pixel unit of an electrochromic display panel according to claim 9, wherein the monochromatic-transparent electrochromic material is selected from a B-T electrochromic material, a G-T electrochromic material, or an R-T electrochromic material.

11. The pixel unit of an electrochromic display panel according to claim 9, wherein the dichromatic-transparent electrochromic material is selected from a B-G-T electrochromic material, a G-R-T electrochromic material, or an R-B-T electrochromic material.

12. The pixel unit of an electrochromic display panel according to claim 8, wherein the first electrode and the second electrode are respectively a reflective electrode, and the third electrode and the fourth electrode are respectively a transparent electrode.

13. The pixel unit of an electrochromic display panel according to claim 8, wherein the first electrode and the second electrode are respectively a transparent electrode, and the third electrode and the fourth electrode are respectively a reflective electrode.

14. The pixel unit of an electrochromic display panel according to claim 1, wherein one of the first substrate and the second substrate is a reflective substrate.

15. A driving method of a pixel unit of an electrochromic display panel, for driving the pixel unit according to claim 1, the method comprising:
    when a first voltage is applied to the first electrode and the second electrode, a second voltage is applied to the third electrode, and a third voltage is applied to the first auxiliary counter electrode, the pixel unit displays black;
    when the first voltage is applied to the third electrode, the second voltage is applied to the first auxiliary counter electrode, and the third voltage is applied to the first electrode and the second electrode, the pixel unit displays white;
    when the first voltage is applied to the third electrode, the second voltage is applied to the first electrode and the second electrode, and the third voltage is applied to the first auxiliary counter electrode, the pixel unit displays a first color;
    when the first voltage is applied to the first electrode and the second electrode, the second voltage is applied to the first auxiliary counter electrode, and the third voltage is applied to the third electrode, the pixel unit displays a second color; and
    when the first voltage is applied to the first auxiliary counter electrode, the second voltage is applied to the third electrode, and the third voltage is applied to the first electrode and the second electrode, the pixel unit displays a third color.

16. The driving method of a pixel unit of an electrochromic display panel according to claim 15, wherein the first voltage is a reduction voltage, the second voltage is an oxidation voltage, and the third voltage is a zero voltage.

17. The driving method of a pixel unit of an electrochromic display panel according to claim 15, wherein the first color, the second color, and the third color are respectively blue, green, and red.

18. A driving method of a pixel unit of an electrochromic display panel, for driving the pixel unit according to claim 8, the method comprising:
    when a first voltage is applied to the first electrode and the second electrode, a second voltage is applied to the third electrode and the fourth electrode, and a third voltage is applied to the first auxiliary counter electrode and the second auxiliary counter electrode, the pixel unit displays black;
    when the first voltage is applied to the third electrode and the fourth electrode, the second voltage is applied to the first auxiliary counter electrode, and the third voltage is applied to the first electrode, the second electrode, and the second auxiliary counter electrode, the pixel unit displays white;
    when the first voltage is applied to the third electrode and the fourth electrode, the second voltage is applied to the first electrode and the second electrode, and the third voltage is applied to the first auxiliary counter electrode and the second auxiliary counter electrode, the pixel unit displays a first color;
    when the first voltage is applied to the first electrode and the second electrode, the second voltage is applied to the first auxiliary counter electrode, and the third voltage is applied to the third electrode, the fourth electrode, and the second auxiliary counter electrode, the pixel unit displays a second color; and
    when the first voltage is applied to the first auxiliary counter electrode, the second voltage is applied to the third electrode and the fourth electrode, and the third voltage is applied to the first electrode, the second electrode, and the second auxiliary counter electrode, the pixel unit displays a third color.

19. The driving method of a pixel unit of an electrochromic display panel according to claim 18, further comprising:
    when the first voltage is applied to the first electrode, the second voltage is applied to the second electrode, and the third voltage is applied to the third electrode, the fourth electrode, the first auxiliary counter electrode, and the second auxiliary counter electrode, the pixel unit displays a fourth color;
    when the first voltage is applied to the first auxiliary counter electrode and the second auxiliary counter electrode, the second voltage is applied to the second electrode and the third electrode, and the third voltage is applied to the first electrode and the fourth electrode, the pixel unit displays a fifth color; and
    when the first voltage is applied to the first electrode, the second voltage is applied to the fourth electrode, and the third voltage is applied to the second electrode, the third electrode, the first auxiliary counter electrode, and the second auxiliary counter electrode, the pixel unit displays a sixth color.

20. The driving method of a pixel unit of an electrochromic display panel according to claim 19, wherein the first voltage is a reduction voltage, the second voltage is an oxidation voltage, and the third voltage is a zero voltage.

21. The driving method of a pixel unit of an electrochromic display panel according to claim 19, wherein the first color, the second color, the third color, the fourth color, the fifth color, and the sixth color are respectively blue, green, red, cyan, magenta, and yellow.

* * * * *